UNITED STATES PATENT OFFICE.

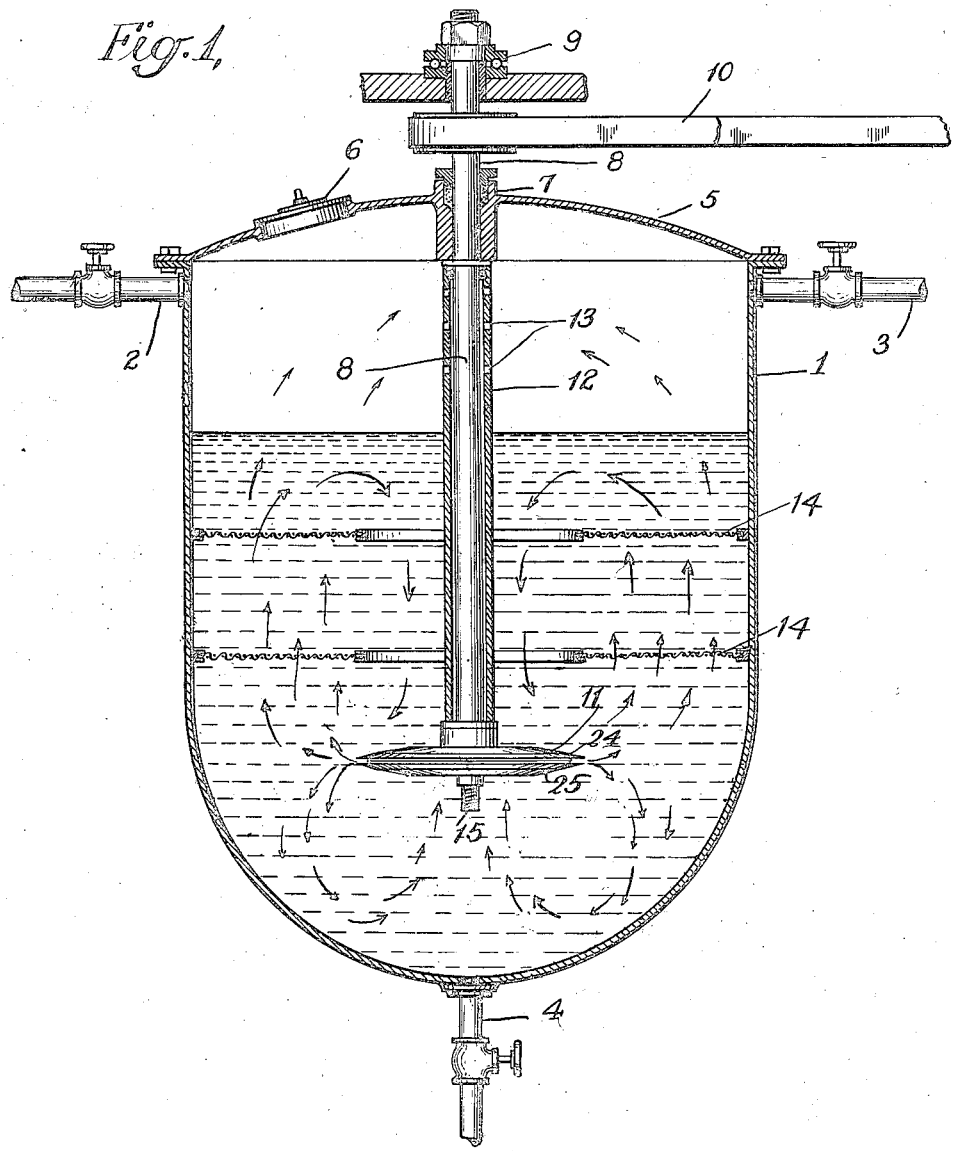

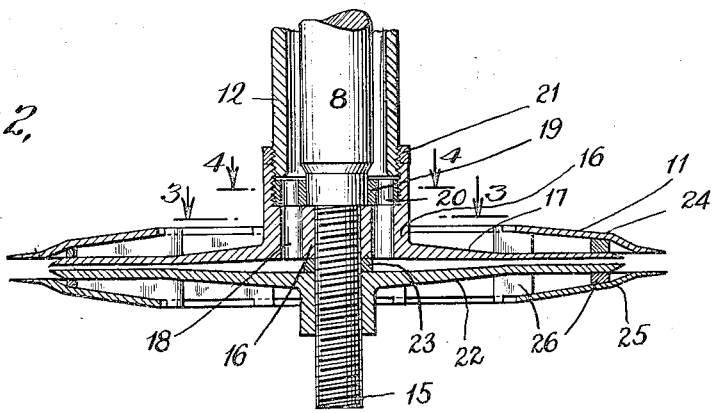
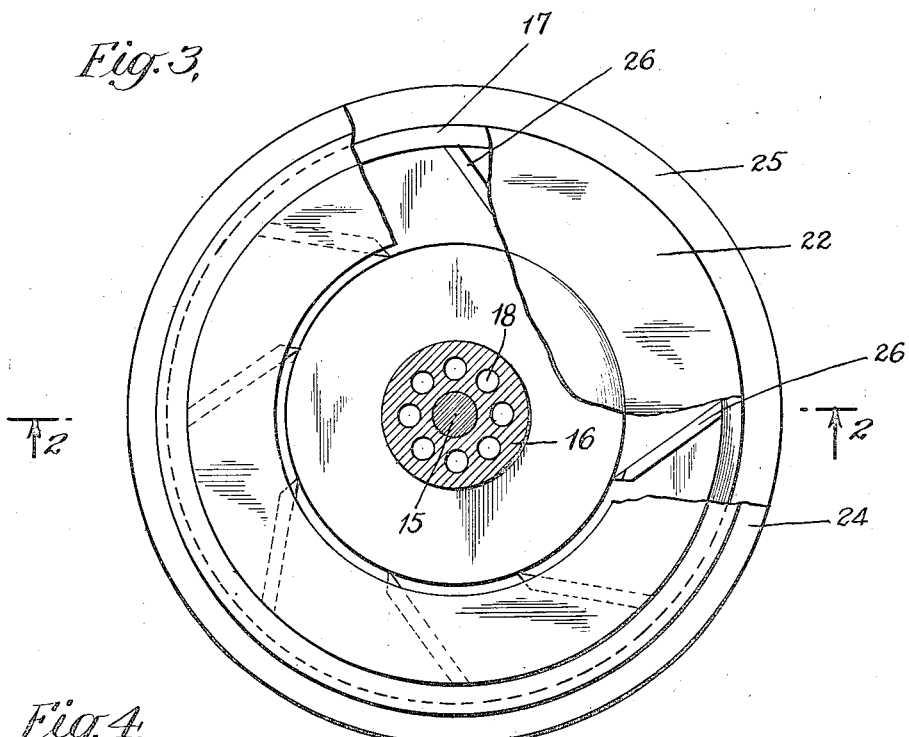
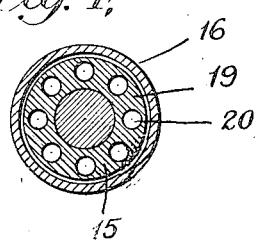

MARTIN HILL ITTNER, OF JERSEY CITY, NEW JERSEY.

HYDROGENATION OF UNSATURATED BODIES.

1,271,576.  Specification of Letters Patent.  Patented July 9, 1918.

Application filed September 27, 1915. Serial No. 52,819.

*To all whom it may concern:*

Be it known that I, MARTIN HILL ITTNER, a citizen of the United States, residing in Jersey City, county of Hudson, State of New Jersey, have invented certain new and useful Improvements in the Hydrogenation of Unsaturated Bodies; and I do hereby declare the following to be a full, clear, and exact description of the invention, such as will enable others skilled in the art to which it appertains to make and use the same.

My invention relates to certain new and useful improvements in hydrogenizing oily material containing unsaturated bodies, *i. e.*, hydrogenizing fatty acids or their esters either wholly or partially, as the case may be, and by the aid of a catalyst whose presence, under suitable thermal conditions, initiates and maintains the hydrogenization.

According to my invention the hydrogenization is accelerated by forcing the oily material, mixed with the catalyst and under appropriate thermal conditions through an orifice or opening arranged below the surface of the material, and so related to the hydrogen employed in the operation, that the gas will be entrained and intimately mixed with the oily material and the catalyst. By carrying out the reaction beneath the surface of the oily material under the conditions described, the mixture of the material with the catalyst and the hydrogen gas is subjected to sudden and extreme variations in pressure, and the constituent elements of the mixture are brought into most intimate relation with each other, so that rapid and effective progress of the hydrogenizing operation is effected.

In carrying out the process of the present invention, the entraining of the hydrogen may be effected either through a stationary or a rotary injector arranged beneath the surface of the oily material, and the material itself can be suitably heated or cooled to secure the desired reaction temperature. That is to say, in initiating the reaction, it is usually necessary to heat the material to a sufficient temperature for effecting the hydrogenation, particularly where the catalyzer does not work efficiently at room temperatures. After the reaction has set in, and heat is disengaged by the reaction, the absorption of hydrogen may become so great that artificial cooling is desirable.

I will now proceed to describe my invention more in detail, in connection with the accompanying drawings, which illustrate a suitable apparatus for practising the invention, it being intended and understood that the invention can be practised in other types of apparatus, with both stationary and rotary injectors arranged beneath the surface of the oily material, each type of injector having important and corresponding advantages.

In the accompanying drawings,—

Figure 1 shows in central vertical section an apparatus provided with a rotary injector or distributer, in which the process of the invention can be practised;

Fig. 2 is a detail sectional view of the rotary injector or distributer;

Fig. 3 is a view taken on the line 3—3 of Fig. 2, with parts broken away; and

Fig. 4 is a view taken on the line 4—4 of Fig. 2.

The apparatus illustrated is of the type wherein a rotating injector or distributer is arranged beneath the surface of the oily material for effecting the desired introduction of the hydrogen and admixture thereof with the oily material.

In the apparatus illustrated, a suitable container is indicated at 1, provided with inlet 2 for the hydrogen, and another inlet 3 for the oily material. An outlet 4, is also provided at the bottom of the apparatus for drawing off the oily material. The apparatus is provided with a cover 5 suitably secured thereto and having therein a handhole or other opening 6 for the introduction of the catalyst and a bearing 7 for the driving shaft 8 of the rotary distributer, suitably supported in bearings 9 and driven by a belt 10. The apparatus will, in practice, usually be provided with heating and cooling means (not shown) for heating or cooling the material and maintaining it at the required temperature. The size and shape of the apparatus, as well as the means for supporting and driving the shaft 8 can be varied, as desired, since obviously many different types of bearings and driving means are available.

Carried by the lower end of the shaft 8 is the rotary injector or distributer 11, from which extends upwardly the sleeve 12, surrounding the shaft 8 and spaced away therefrom. This sleeve is suitably supported at its upper end, with respect to the shaft, and is provided with three rows of inlets 13 leading from the surrounding atmosphere to the space between the sleeve and the shaft.

By reference to Figs. 2 and 3, it will be seen that the rotary injector or distributer is made up of upper and lower elements 17 and 22, spaced apart by the ring 23, and suitably fastened upon the threaded end 15 of the shaft 8. The upper member 17 has an upwardly extending portion 16 having holes 18 therein, which communicate with corresponding holes 20 in the connection 19, these holes in turn communicating with the space between the shaft and sleeve, as clearly shown in the drawing. A lock nut 21 is provided at the upper end of the member 17. Carried by the members 17 and 22, and spaced apart therefrom by spacing members 26, are the outer annular members 24 and 25 suitably secured thereto as by brazing or otherwise.

By reference to Fig. 3 it will be seen that the spacing members 26 are arranged somewhat at an angle so that they exert an outward impelling effect upon the oily material during their rotation. The arrangement is such that the rotary injector or distributer acts centrifugally, much as a centrifugal pump, for drawing in the oily material from above and below through the central annular openings, and discharging the same outwardly between the spacing members 26. The arrangement is also such that hydrogen gas will be entrained through the narrow space between the members 17 and 22, and will thus be intimately mixed with the oily material.

In carrying out the process of the present invention in the apparatus described, a large volume of the oily material, mixed with the catalyzer, is introduced into the receptacle 1, to a suitable level such as that indicated in Fig. 1, and this oily material is brought to the desired temperature for the reaction by any suitable heating means (not shown). The rotary injector or distributer is then set in motion, hydrogen, preferably under pressure, being introduced into the space above the oily material. The rotary injector causes a circulation of the oily material outwardly therethrough as indicated roughly by the arrows in Fig. 1. This material will tend to circulate both upwardly and downwardly with respect to the injector, and will then tend to return and again pass through the injector. During its passage through the injector, hydrogen will be entrained and intimately mixed with, and distributed through, the oily material. This is due to the suction resulting from the passage outwardly and centrifugally, of the oily material through the injector, the hydrogen being drawn into the space between the shaft and sleeve through the holes 13 and thence down and out through the space between the members 17 and 22. During this circulation through the injector, the mixture is subjected to sudden and extreme variations in pressure, a diminished pressure being caused by the suction of the rotating injector and an increased pressure being subsequently caused by the discharge from the injector outwardly into the main body of the material.

These variations in pressure, and the intimate intermixing of the liquid, hydrogen, and catalyzer, cause the reaction to take place in a particularly advantageous manner, superior to that which is obtained by known methods of mechanical stirring or agitation.

Contrary to what might be expected, I find it more advantageous to avoid too much agitation of the liquid mixture. To this end I find it advantageous to place stationary screens or other suitable perforated baffles 14 beneath the surface of the liquid in such a manner as to break up and prevent any strong currents of the liquid, and particularly any such currents as might result in the formation of a vortex, due to the centrifugal action of the injector. With the intimate intermixture of the liquid catalyzer and gas, approximating a state of molecular division, agitation can add little to the efficiency of the process, and it is desirable to maintain the finely divided hydrogen below the surface of the oily material as long as possible. I find that when the particles of hydrogen are reduced to such a finely divided state, they have very little tendency to rise to the surface. Undue agitation of the liquid mixture will tend to send up strong currents which will have the effect of separating the gas to a greater or less degree from the oil and catalyst, owing to the much greater density of the oil and catalyst which will tend to cause the gas to move inwardlly toward the center of the apparatus.

In order to prevent such separation as much as possible and break up such objectionable currents, one or more such wire screens or other suitable baffles are arranged in the path of the upward currents of the mixture and hydrogen. The currents are thus broken up without simply being deflected, and the minute particles of gas are prevented to a considerable extent from uniting to form large bubbles, so that the unabsorbed gas which rises to the surface breaks through in almost invisible globules.

During the operation of the apparatus, the volume of gas in its fine state of division throughout the mixture is so great, and its rate of disengagement is so slow, that the surface of the liquid is raised very appreciably above the normal level of the liquid when the apparatus is not in operation.

After the apparatus has been set in operation, the oily material will tend to pass and re-pass through the injector, in a cyclic manner. During each passage through the injector, further amounts of hydrogen will be entrained, and the mixture will be subjected to variations in pressure, in the manner already described. Fresh particles of oil and gas are thus brought into contact with each other, and with the catalyzer. The rotary injector causes a sufficient circulation of the oily material to prevent the catalyzer from settling out, but does not cause an objectionable amount of circulation such as would result in the formation of a vortex or the separation of the hydrogen, centrifugally, from the heavier oil and catalyst.

Any hydrogen which escapes from the surface of the oily material, unabsorbed, will be returned again to the injector and discharged into the oily material. Fresh amounts of hydrogen can be introduced into the apparatus as desired, and a pressure greater than atmospheric can readily be maintained. Should the hydrogen become impure, it can be drawn off and a fresh supply introduced.

Various kinds of oily material, well known in the art, can be treated in the manner above described. Accordingly, the process of the present invention is not limited to the treatment of any particular kind of unsaturated oily material, but is of general application. Similarly I do not limit myself to any particular kind of catalyzer, since obviously different catalyzers can be used for effecting the hydrogenation. A suitable form is described in my prior application Serial No. 838,478, filed May 14, 1914.

My process has the advantage over processes in which films or sprays are used, that the hydrogenation can be effected in a smoother and more advantageous manner. In the use of films or sprays, the oily material of the film or spray in contact with atmosphere of hydrogen may become completely saturated while other parts of the oil will remain unsaturated, with the result that some highly unsaturated constituents may thus escape treatment even up to the point where nearly complete saturation is effected.

In the present process, where the operation is carried on under the surface of the oily material being treated, and where a sensible excess of the material is always maintained, there is a tendency toward a selective hydrogenation of the more unsaturated molecules which are thus among the first to be acted upon, and which are thus reduced before the lesser unsaturated bodies are appreciably attacked. As a result the hydrogenation proceeds uniformly and smoothly and can be stopped before complete saturation to obtain a partly hydrogenized product. This is particularly valuable where it is not desired to effect complete reduction, but where it is nevertheless desired to remove and reduce the more highly unsaturated constituents.

After the reaction has proceeded to the desired extent, the mixture of fatty acids or their esters, with the catalyzer may be withdrawn and the catalyzer removed by well-known methods, so that it can be again employed in the reaction and the fatty acids or esters, in a hydrogenized or partly hydrogenized state are thus obtained in condition for use.

The process of the present invention is somewhat similar to, and an improvement upon, the process of my prior application Serial No. 836,624, filed May 6, 1914, but is distinguished therefrom by the fact that the injector is arranged beneath the surface of the oily material, and by the further fact that the injector is, in the preferred embodiments of the invention, of a rotary, and centrifugally acting, type. It will be readily understood that this rotary injector will, in practice, have a suitable speed for securing the desired intimate distribution of the hydrogen with the oily material, without giving rise to objectional centrifugal currents such as would result in the formation of a vortex. The size of the rotary injector, as well as the size of the apparatus, can be varied, as will be readily understood. In practice, I have found an injector having the disks 17 and 22 spaced apart a distance of about $\frac{1}{16}$ inch, suitable for obtaining the desired intimate distribution and intermixture of the hydrogen gas in the oily material. In Fig. 1, the receptacle is shown as having a hemispherical bottom. This arrangement is not essential but, in some cases more advantageous in order that smooth circulation of the oily material through the injector may take place. The circulation is indicated roughly by the arrows in Fig. 1, but these arrows are intended to be merely diagrammatic and illustrative of the circulation which takes place.

While I have described the process of the present invention more particularly in connection with the apparatus illustrated and described, yet it will be understood that other types of apparatus can be employed without departing from the spirit and scope of the invention.

What I claim is:

1. The process of hydrogenizing oily material containing unsaturated bodies, which comprises forcing the material, mixed with a catalyzer, through an orifice or opening below the surface of the material, which orifice or opening communicates below the surface of the oily material with a supply of hydrogen gas, and causing the mixture of oily material and catalyzer to entrain or draw in hydrogen, and thereby effecting an intimate mixture of the oily material and the hydrogen gas; substantially as described.

2. The process of hydrogenizing oily material containing unsaturated bodies, which comprises forcing the material, mixed with a catalyzer, centrifugally outward through an orifice or opening below the surface of the material, which orifice or opening communicates with a supply of hydrogen gas, whereby hydrogen gas is drawn into the mixture of oily material and catalyzer and whereby an intimate mixture of the oily material and the hydrogen gas is brought about; substantially as described.

3. The process of hydrogenizing oily material containing unsaturated bodies, which comprises forcing the material, mixed with a catalyzer, through a rotary orifice or opening below the surface of the material, which orifice or opening communicates below the surface of the oil material with a supply of hydrogen gas, whereby hydrogen gas is drawn in to the mixture of oily material and catalyzer and whereby an intimate mixture of the oily material and the hydrogen gas is brought about, and interposing barriers in the path of the resulting currents of the mixture; substantially as described.

4. The process of hydrogenizing oily material containing unsaturated bodies, which comprises subjecting the material, mixed with a catalyzer and with hydrogen gas, to sudden variations in pressure below the surface of the material, whereby the hydrogenizing reaction is promoted; substantially as described.

5. The process of hydrogenizing oily material containing unsaturated bodies, which comprises subjecting the material, mixed with a catalyzer and with hydrogen gas, alternately to increased pressure and to decreased pressure below the surface of the material, whereby the hydrogenizing reaction is promoted; substantially as described.

6. The process of hydrogenizing oily material containing unsaturated bodies, which comprises forcing the material, mixed with a catalyzer, centrifugally outward through an orifice or opening in a rotary distributer below the surface of the material, which orifice or opening communicates with a supply of hydrogen gas, and thereby entraining and intimately mixing hydrogen with such material, and continuing the circulation of the material mixed with the hydrogen through said distributer and thereby entraining further amounts of the hydrogen, until the desired hydrogenizing has been effected; substantially as described.

7. The process of hydrogenizing oily material containing unsaturated bodies, which comprises forcing the material, mixed with a catalyzer, centrifugally outward through an orifice or opening in a rotary distributer below the surface of the material, which orifice or opening communicates with a supply of hydrogen gas, and thereby entraining and intimately mixing hydrogen with such material, continuing the circulation of the material mixed with the hydrogen through said distributer and thereby entraining further amounts of the hydrogen, until the desired hydrogenizing has been effected, and interposing wire screens or other baffles to break up the currents of the mixture and prevent the formation of a vortex; substantially as described.

In testimony whereof I affix my signature.

MARTIN HILL ITTNER.